(12) United States Patent
Taira

(10) Patent No.: US 10,148,004 B2
(45) Date of Patent: Dec. 4, 2018

(54) ROOF-MOUNT ANTENNA MOUNTING STRUCTURE

(71) Applicant: HARADA INDUSTRY CO., LTD., Tokyo (JP)

(72) Inventor: Kenji Taira, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 6 days.

(21) Appl. No.: 15/502,730

(22) PCT Filed: Aug. 11, 2015

(86) PCT No.: PCT/JP2015/072811
§ 371 (c)(1),
(2) Date: Feb. 8, 2017

(87) PCT Pub. No.: WO2016/024601
PCT Pub. Date: Feb. 18, 2016

(65) Prior Publication Data
US 2017/0237156 A1    Aug. 17, 2017

(30) Foreign Application Priority Data

Aug. 14, 2014  (JP) .................................. 2014-165137

(51) Int. Cl.
*H01Q 1/32* (2006.01)
*B60R 11/00* (2006.01)
*H01Q 1/12* (2006.01)

(52) U.S. Cl.
CPC ........... *H01Q 1/3275* (2013.01); *B60R 11/00* (2013.01); *H01Q 1/1214* (2013.01); *B60R 2011/004* (2013.01); *B60R 2011/0043* (2013.01)

(58) Field of Classification Search
CPC ............... B60R 11/00; B60R 2011/004; B60R 2011/0043; B60R 11/02; H01Q 1/1214; H01Q 1/3275; H01Q 1/22; H01Q 1/32
See application file for complete search history.

(56) References Cited

U.S. PATENT DOCUMENTS 3,076,936 A * 2/1963 Housman ................ B60R 11/02
                                                              174/152 A
6,486,841 B1   11/2002 Imahigashi
(Continued)

FOREIGN PATENT DOCUMENTS

JP    2001036315 A    2/2001
JP    2001315561 A    11/2001
(Continued)

OTHER PUBLICATIONS

International Search Report in PCT/JP2015/072811 dated Oct. 13, 2015.

*Primary Examiner* — Tho G Phan
(74) *Attorney, Agent, or Firm* — Global IP Counselors, LLP

(57) ABSTRACT

A roof-mount antenna mounting structure, that can be reliably electrically connected and fixed to a vehicle roof and easily removed, includes an antenna base, first and second threaded portions, a leg washer, a leg-receiving portion, and a protruding portion. The leg washer has a washer ring having a hole through which the first threaded portion penetrates and a plurality of leg portions extending from the washer ring and each having a claw that can abut against the roof. The leg-receiving portion is detachably provided around the first threaded portion and has an abutment edge portion. The protruding portion has, at the inside of the leg portions, an inclined surface obliquely abutting against the abutment edge portion when the first and second threaded portions are fastened with each other to apply a pressing (Continued)

force to spread the leg portions outward with respect to the axis of the first threaded portion.

16 Claims, 5 Drawing Sheets

(56) References Cited

U.S. PATENT DOCUMENTS

| | | | |
|---|---|---|---|
| 7,088,297 B2* | 8/2006 | Nakano | H01Q 1/1207 343/711 |
| 7,215,291 B2* | 5/2007 | Nakano | H01Q 1/1242 343/711 |
| 7,336,231 B2 | 2/2008 | Hayashi et al. | |

FOREIGN PATENT DOCUMENTS

| | | |
|---|---|---|
| JP | 2006248486 A | 9/2006 |
| JP | 2011194949 A | 10/2011 |

* cited by examiner

ROOF-MOUNT ANTENNA MOUNTING STRUCTURE

CROSS-REFERENCE TO RELATED APPLICATIONS

This U.S. National stage application of International Patent Application No. PCT/JP2015/072811, filed on Aug. 11, 2015, which, in turn, claims priority under 35 U.S.C. § 119(a) to Japanese Patent Application No. 2014-165137, filed in Japan on Aug. 14, 2014, the entire contents of which are hereby incorporated herein by reference.

TECHNICAL FIELD

The present invention relates to a roof-mount antenna mounting structure, and more particularly to a roof-mount antenna structure that is inserted into and fixed to a mounting hole formed through a vehicle roof.

BACKGROUND ART

For example, as disclosed in Japanese Patent Application Kokai Publication No. 2001-036315, a conventional vehicle roof-mount antenna is fixed to a vehicle roof in such a way that a screw boss protruding from an antenna base is inserted into a mounting hole formed through the vehicle roof, and a nut is fastened to the screw boss from a vehicle interior side. In such a configuration, a worker may be in danger of dropping the nut during mounting work, or workability may be deteriorated since the worker makes the fastening from the vehicle interior side through the vehicle roof.

To solve such deterioration of workability, Japanese Patent Application Kokai Publication No. 2006-248486 filed by the same applicant as the present application discloses a roof-mount antenna mounting structure capable of facilitating the mounting of the antenna to the vehicle and thus reducing a burden on a worker. The mounting structure uses a leg washer and is inserted into a mounting hole formed through a vehicle roof from outside a vehicle interior. Then, in association with the fastening of bolt and the like, leg portions of the leg washer abut against an abutment portion formed in a screw boss to be spread, with the result that claws of the respective leg portions bite into a vehicle interior side of the vehicle roof, whereby fixing to the vehicle roof and electrical connection to (grounded to) the vehicle roof can be achieved.

Further, as a structure for preventing deformation of the washer portion of Japanese Patent Application Kokai Publication No. 2006-248486, a roof-mount antenna mounting structure using a reinforcing plate disposed so as to overlap the washer portion is disclosed in Japanese Patent Application Kokai Publication No. 2011-194949 filed by the same applicant as the present application.

SUMMARY

In the roof-mount antenna mounting structures described in Japanese Patent Application Kokai Publication Nos. 2006-248486 and 2011-194949, the leg portions of the leg washer abut against the abutment portion formed in the screw boss to be spread, so that the abutment portion of the screw boss is held between the leg portions. In this case, the leg washer would be firmly fixed while holding the screw boss with its leg portions, causing difficulty in releasing the leg washer. Therefore, a problem may occur in which a roof-mount antenna cannot be removed from the vehicle when there is a need to remove the roof-mount antenna for maintenance, etc.

An object of the present invention, therefore, is to overcome the problems existing in the prior art, and to provide a roof-antenna mounting structure that can be reliably electrically connected and fixed to the vehicle roof when being mounted and easily removed from the vehicle roof when there is a need for removal.

To achieve the above object, a roof-mount antenna mounting structure according to the present invention includes an antenna base disposed outside a vehicle interior, a first threaded portion provided on the antenna base so as to protrude toward the vehicle roof and to be inserted into a mounting hole formed through the vehicle roof, a second threaded portion fastened with the first threaded portion, a leg washer including a washer ring having a hole through which the first or second threaded portion penetrates and a plurality of leg portions extending from the washer ring and each having a claw that is able to abut against the vehicle roof, a leg-receiving portion detachably provided around the first threaded portion and having an abutment edge portion, and a protruding portion having, at the inside of the leg portions, an inclined surface that obliquely abuts against the abutment edge portion of the leg-receiving portion when the first and second threaded portions are fastened with each other through the washer ring of the leg washer to apply a pressing force to spread the leg portions outward with respect to the axis of the first threaded portion.

The protruding portion may be formed by bending the leg portion of the leg washer in a dog-leg shape in vertical cross section.

The protruding portion may be formed of a triangular plate-like body extending from the side surfaces of each leg portion of the leg washer.

The protruding portion may be formed so as to connect the vicinities of tip ends of at least two leg portions of the leg washer and to be bent in a dog-leg shape in vertical cross section between the two leg portions.

The leg-receiving portion may have an engaging claw engaged in the mounting hole formed through the vehicle roof.

When the fastening of the first and second threaded portion are loosened, the leg-receiving portion may be separated from the periphery of the first threaded portion together with the leg washer.

The roof-mount antenna mounting structure according to the present invention has an advantage in that it can be reliably electrically connected and fixed to the vehicle roof when being mounted and can easily be removed from the vehicle roof when there is a need for removal.

DETAILED DESCRIPTION OF EMBODIMENTS

Figure 1:
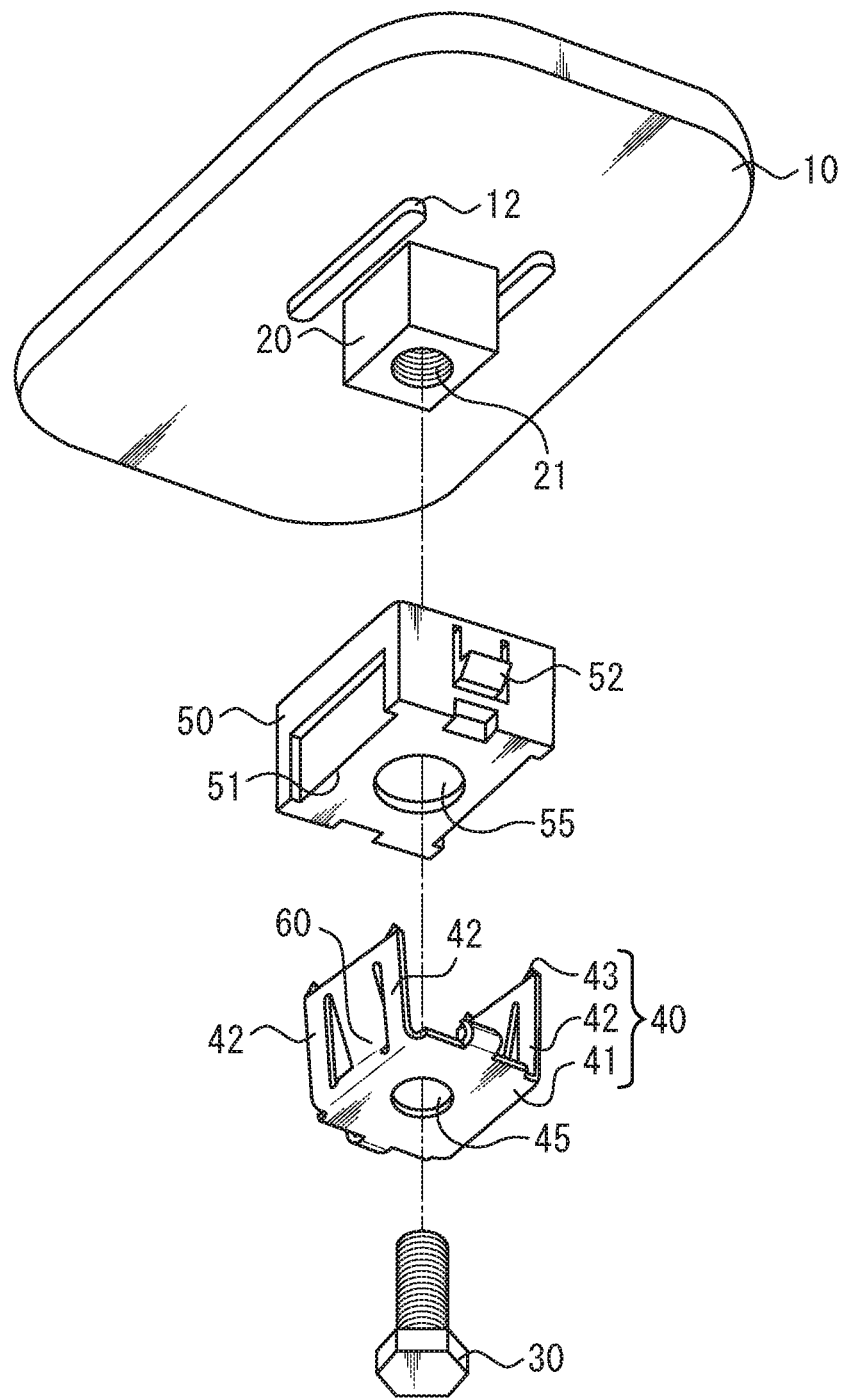
FIG. 1 is an exploded perspective view of a roof-mount antenna mounting structure according to a disclosed embodiment.

Hereinafter, an embodiment for practicing the present invention will be described with reference to the accompanying drawings. FIG. 1 is an exploded perspective view of a roof-mount antenna mounting structure according to the present invention. As illustrated, the roof-mount antenna mounting structure according to the present invention mainly includes an antenna base 10, a first threaded portion 20, a second threaded portion 30, a leg washer 40, and a leg-receiving portion 50. The roof-mount antenna mounting structure further includes a housing portion provided so as to cover the antenna base 10 and an antenna element, which are not illustrated here.

The antenna base 10 is disposed outside a vehicle interior. More specifically, the antenna base 10 is disposed on a vehicle roof outside the vehicle interior and has a circuit board and the like placed thereon. The antenna base 10 may function as the ground for the circuit board or an antenna to be mounted thereto and may be formed of a conductor. Alternatively, the antenna base 10 may be formed of resin. A claw receiving base 12 may be provided on the vehicle roof-side surface of the antenna base 10 as needed.

The first threaded portion 20 is provided on the antenna base 10 so as to protrude toward the vehicle roof side. The first threaded portion 20 is inserted into a mounting hole formed through the vehicle roof. In the illustrated example, the first threaded portion 20 has a female threaded hole 21. The first threaded portion 20 has a hole (not illustrated) through which a cable or the like can be inserted, and the antenna and a receiver or the like in the vehicle interior are connected to each other by the cable through the hole.

The second threaded portion 30 is fastened with the first threaded portion 20. In the illustrated example, the second threaded portion 30 is a male thread (bolt). That is, the second threaded portion 30 is screwed into the female threaded hole 21 of the first threaded portion 20.

The leg washer 40 has a washer ring 41 and a plurality of leg portions 42. The leg washer 40 may be integrally formed by pressing, e.g., a metal plate. More specifically, the leg portions 42 integrally extend from the periphery of the washer ring 41. A protruding portion 60 having an inclined surface as described later is provided at the inner side of the leg portions 42. The washer ring 41 has a hole 45 through which the second threaded portion 30 penetrates. In the illustrated example, the washer ring 41 has a substantially a quadrangular shape; nonetheless, the present invention is not limited to this, and the washer ring 41 may have any shape such as a circular shape, a hexagonal shape, or an octagonal shape. The plurality of leg portions 42 extend from the washer ring 41. In the illustrated example, the two leg portions 42 extend from each of both side ends of the washer ring 41. That is, two leg portions 42 extend from each of two sides of the washer ring 41, and the remaining two sides that have no leg portion 42 may be made to correspond to a cable insertion hole (not illustrated) formed in the first threaded portion 20. A claw 43 that is able to abut against the vehicle roof is provided at the tip end of each leg portion 42. The claw 43 bites into the vehicle roof when the bolt is fastened. The claw receiving base 12 of the antenna base 10 is positioned so as to correspond to the biting position of the claw 43 through the vehicle roof so that the vehicle roof is sandwiched between the claw receiving base 12 and claws 43.

The leg-receiving portion 50, which the most characteristic portion in the present invention, is detachably provided around the first threaded portion 20. Specifically, the leg-receiving portion 50 is provided so as to cover the first threaded portion 20. The leg-receiving portion 50 has an abutment edge portion 51. As will be described later in detail, the abutment edge portion 51 abuts against the protruding portion 60 provided between the leg portions 42 so as to spread the leg portions 42. For example, the leg-receiving portion 50 may be formed of a resin material in consideration of easiness of production, weight, and cost. Alternatively, the leg-receiving portion 50 may be formed of a metal material. The leg-receiving portion 50 has a hole 55 through which the second threaded portion 30 penetrates. The leg-receiving portion 50 has an engaging claw 52 to be engaged in the mounting hole formed through the vehicle roof. When the mounting structure is inserted into the mounting hole formed through the vehicle roof from outside the vehicle interior, the engaging claw 52 is engaged in the mounting hole formed through the vehicle roof, whereby the roof-mount antenna is temporarily fixed to the vehicle roof.

The protruding portion 60 is provided between the leg portions 42 of the leg washer 40. The protruding portion 60 has an inclined surface at the inner side of the leg portions 42. For example, the leg portion 42 integrally extending from the periphery of the washer ring 41 is bent inward in a dog-leg shape to form the protruding portion 60. When the first threaded portion 20 and the second threaded portion 30 are fastened with each other through the washer ring 41 of the leg washer 40, the protruding portion 60 obliquely abuts against the abutment edge portion 51 of the leg-receiving portion 50, whereby a pressing force to spread the leg portions 42 outward with respect to the axis of the first threaded portion 20 is applied. As a result, the leg portions 42 are spread outward.

Figure 2A:
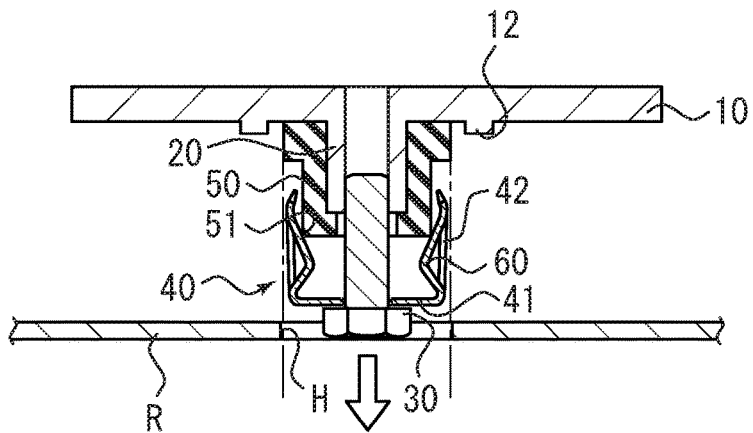
FIGS. 2A to 2D are schematic cross-sectional views for explaining the behavior of leg portions of a leg washer of the roof-mount antenna mounting structure according to a disclosed embodiment.
Figure 2B:
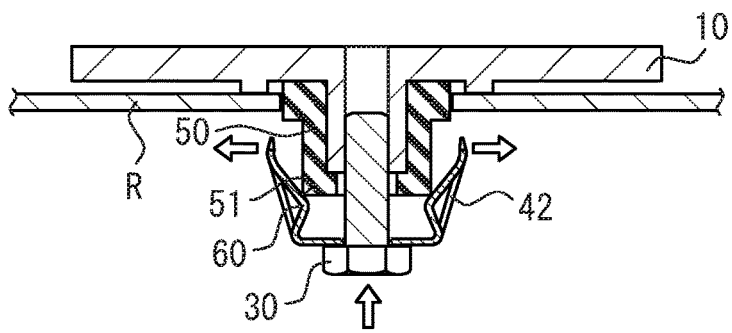
Figure 2C:
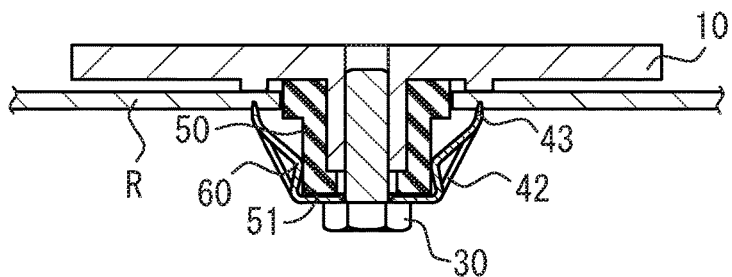
Figure 2D:
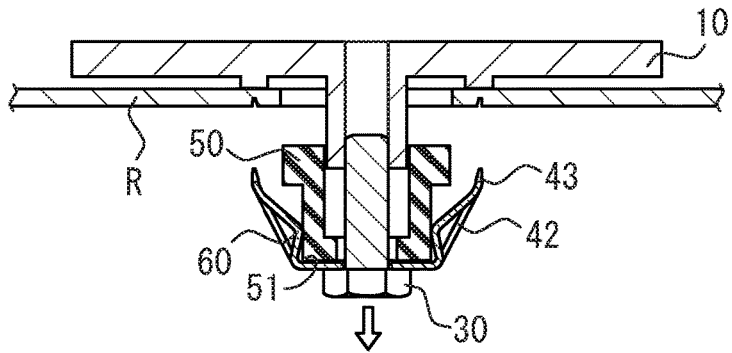

The behavior of the leg portions is described by using FIGS. 2A to 2D. FIGS. 2A to 2D are schematic cross-sectional views for explaining the behavior of the leg portions of the leg washer of the roof-mount antenna mounting structure according to the present invention. FIG. 2A illustrates a state before mounting to the vehicle roof, FIG. 2B illustrates a state where the bolt is fastened, FIG. 2C illustrates a state after engagement of the bolt, and FIG. 2D illustrates a state where the fastening of the bolt is loosened. In the drawing, the same reference numerals as those in FIG. 1 denote the same parts as those in FIG. 1.

As illustrated, the leg washer 40 of the roof-mount antenna mounting structure according to the present invention has a width large enough to pass itself through a mounting hole H formed in a vehicle roof R before the plurality of leg portions 42 are spread. The roof-mount antenna mounting structure is inserted into the mounting hole H formed in the vehicle roof R from outside the vehicle interior in a state where the first threaded portion 20, second threaded portion 30, leg washer 40, and leg-receiving portion 50 are assembled to each other (see FIG. 2A). When the engaging claws 52 are provided in the leg-receiving portion 50, they are engaged in the mounting hole H of the vehicle roof R, whereby the roof-mount antenna is temporarily fixed to the vehicle roof. The roof-mount antenna mounting structure can be inserted into the mounting hole H in a state where the second threaded portion 30 is temporarily fastened thereto beforehand, thus preventing the bolt from dropping at the time of the fastening thereof. A base portion of the leg-receiving portion 50 on the antenna base 10 side can be made to have a shape almost coinciding with the shape of the mounting hole H of the vehicle roof R. Thus, when the base portion of the leg-receiving portion 50 is fitted to the mounting hole H, the antenna base 10 is prevented from being rotated and backlashing with respect to the vehicle roof R.

Thereafter, when the bolt as the second threaded portion 30 is fastened, the protruding portion 60 provided on the inner side of the leg portions 42 abut against the abutment edge portion 51 of the leg-receiving portion 50 so as to spread the leg portions 42 of the leg washer 40 outward. The protruding portion 60 obliquely abuts against the abutment edge portion 51 of the leg-receiving portion 50, whereby a pressing force to spread the leg portions 42 outward is applied to the axis of the first threaded portion 20. Thus, as the bolt is fastened, the leg portions 42 are spread outward (see FIG. 2B). Then, when the fastening of the second threaded portion 30 is done, the leg portions 42 are spread, and the claw 43 provided at the tip end of each leg portion 42 bits into the vehicle roof, whereby electrical connection and fixation are accomplished (see FIG. 2C). As illustrated, the claw 43 is provided at an angle to the vehicle roof R side from the leg portion 42 so as to bite into the vehicle roof R when the leg portion 42 is spread. Further, as illustrated, the claw receiving base 12 is disposed so as to correspond to the biting position of the claw 43 through the vehicle roof R.

As illustrated in FIG. 2C, when the fastening is done, the plurality of leg portions 42 are spread and, thereby, the length between the tip ends of the leg portions 42 facing each other across the second threaded portion 30 is larger than the width of the mounting hole H of the vehicle roof R. This prevents the roof-mount antenna mounting structure from coming out of the mounting hole H and allows the roof-mount antenna mounting structure to be mounted reliably only by fastening work carried out inside the vehicle interior. Thus, it is only necessary for a worker to insert the roof-mount antenna mounting structure into the mounting hole H of the vehicle roof R before performing the fastening of the bolt in the vehicle interior, which is advantageous in workability.

Then, as illustrated in FIG. 2D, when the fastening of the bolt is loosened at replacement of the roof-mount antenna, the leg-receiving portion 50 is separated from the periphery of the first threaded portion 20 together with the leg washer 40. That is, in the leg washer 40 of the roof-mount antenna mounting structure according to the present invention, the leg portions 42 are spread by the leg-receiving portion 50, so that the leg portions 42 remains stuck fast to the leg-receiving portion 50 and are thus fixed to the leg-receiving portion 50. However, the leg-receiving portion 50 is detachably provided around the first threaded portion 20, so that the leg washer 40 is easily disengaged from the first threaded portion 20 together with the leg-receiving portion 50. Thus, the roof-mount antenna can easily be removed from the vehicle roof.

As described above, by using the roof-mount antenna mounting structure according to the present invention, the roof-mount antenna can be reliably electrically connected and fixed to the vehicle roof when being mounted and can easily be removed from the vehicle roof when needed.

Figure 3A:
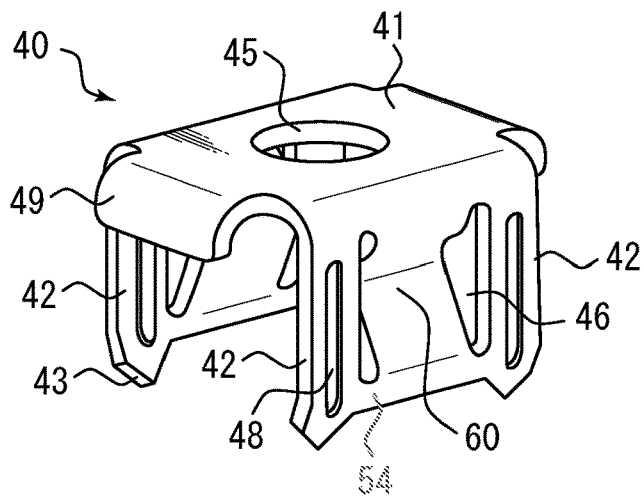
FIGS. 3A and 3B are schematic views for explaining an example of the leg washer of the roof-mount antenna mounting structure according to a disclosed embodiment.
Figure 3B:
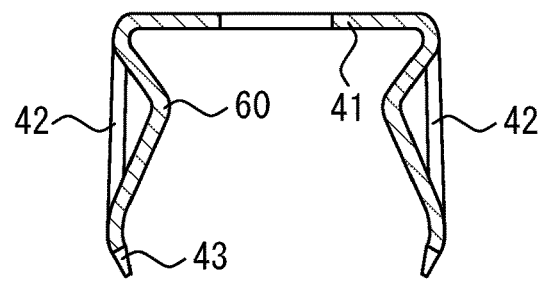

The leg washer of the roof-mount antenna mounting structure according to the present invention is described more specifically as follows. FIGS. 3A and 3B are schematic views for explaining an example of the leg washer of the roof-mount antenna mounting structure according to the present invention. FIG. 3A is a perspective view of the leg washer, and FIG. 3B is a cross-sectional view passing through the protruding portions. In the drawing, the same reference numerals as those in FIG. 1 denote the same parts as those in FIG. 1. In this example, the protruding portion 60 is formed by partially connecting the leg portions 42 of the leg washer 40, followed by deformation. As illustrated, the protruding portion 60 is formed so as to connect the vicinities of the tip ends of at least two leg portions 42 of the leg washer 40 and to be bent in a dog-leg shape in vertical cross section between the two leg portions 42. That is, the vicinities of the tip ends of the respective two leg portions 42 are connected by a connecting portion 54. The protruding portion 60 is formed between the two leg portions 42. For example, when the leg washer 40 is formed by pressing a metal plate, slits 46 are formed between the two leg portions 42, and a center portion separated from the two leg portions 42 by the slits is bent in a dog-leg shape by drawing so as to have an inclined surface at the inner side of the leg portions 42, whereby the protruding portion 60 is formed. The width of each leg portion 42 and that of the protruding portion 60 may be controlled by adjusting the position and width of the slit 46 so that the leg portions 42 bite into the vehicle roof without being bent in the middle thereof and are spread outward by the protruding portion 60. Thus, the leg portions 42 are designed so as to bite the vehicle roof, and the protruding portion 60 is designed so as to spread the leg portions 42 outward. Further, as illustrated, a reinforcing rib 48 may be formed in each leg portion 42. Further, a bent portion 49 extending from the washer ring 41 may, be formed by bending a part of the washer ring 41 that has no leg portion 42. This reinforces the washer ring 41 to thereby prevent deformation of the washer ring 41 when the bolt is fastened.

Figure 4A:
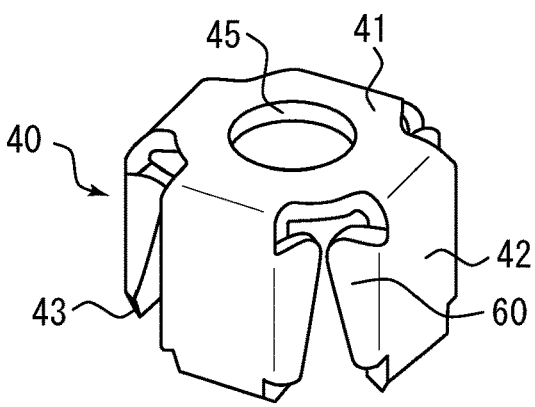
FIGS. 4A and 4B are schematic views for explaining another example of the leg washer of the roof-mount antenna mounting structure according to a disclosed embodiment.
Figure 4B:
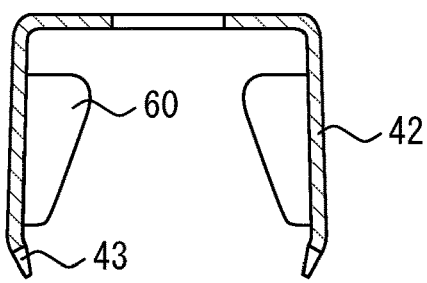

In the roof-mount antenna mounting structure according to the present invention, the leg washer is not limited to the above illustrated example. Another example will be described below. FIGS. 4A and 4B are schematic views for explaining another example of the leg washer of the roof-mount antenna mounting structure according to the present invention. FIG. 4A is a perspective view of the leg washer, and FIG. 4B is a cross-sectional view passing through the leg portions. In the drawing, the same reference numerals as those in FIG. 1 denote the same parts as those in FIG. 1. In this example, the protruding portion 60 is formed of a substantially triangular plate-like body extending from the side surfaces of each leg portion 42 of the leg washer 40. As illustrated, the protruding portion 60 is formed by bending inward the both side portions of each leg portion 42 of the leg washer 40. The bent portion has a triangular shape tapered from the root of the leg portion 42 to the tip end thereof. Thus, the protruding portion 60 having an inclined surface at the inside of the leg portions 42 is formed so as to apply a pressing force to spread the leg portions 42 outward.

Figure 5A:
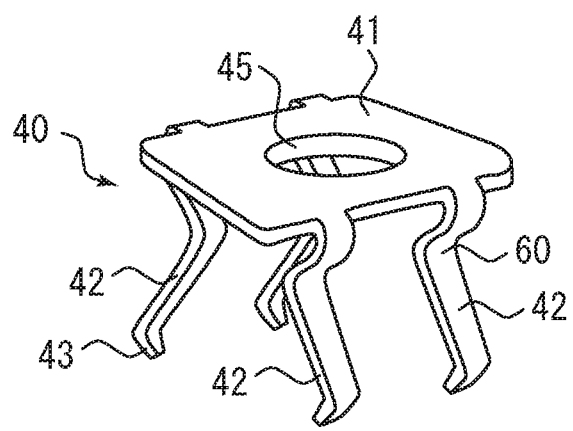
FIGS. 5A and 5B are schematic views for explaining a still another example of the leg washer of the roof-mount antenna mounting structure according to a disclosed embodiment.
Figure 5B:
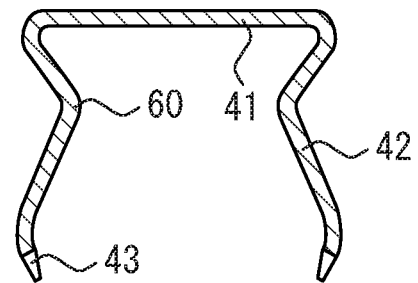

FIGS. 5A and 5B are schematic views for explaining a still another example of the leg washer of the roof-mount antenna mounting structure according to the present invention. FIG. 5A is a perspective view of the leg washer, and FIG. 5B is a cross-sectional view passing through the leg portions. In the drawing, the same reference numerals as those in FIG. 1 denote the same parts as those in FIG. 1. In this example, the leg portion 42 of the leg washer 40 is bent in a dog-leg shape in vertical cross section to thereby form the protruding portion 60. As illustrated, the leg portion 42 of the leg washer 40 having a simple elongated shape is bent in a dog-leg shape in vertical cross section so as to have an inclined surface at the inner side thereof, whereby the protruding portion 60 is formed. Thus, the protruding portion 60 having an inclined surface at the inside of the leg portions 42 is formed so as to apply a pressing force to spread the leg portions 42 outward.

The leg washer of the roof-mount antenna mounting structure according to the present invention is not limited to the above illustrated examples. For example, a leg washer having a reinforcing plate as described in the above Japanese Patent Application Kokai Publication No. 2011-194949 may be adopted. Further, in the above illustrated examples, the washer ring of the leg washer has a substantially quadrangular shape; however, the present invention is not limited to this, and the washer ring 41 may have a substantially circular shape.

Figure 6:
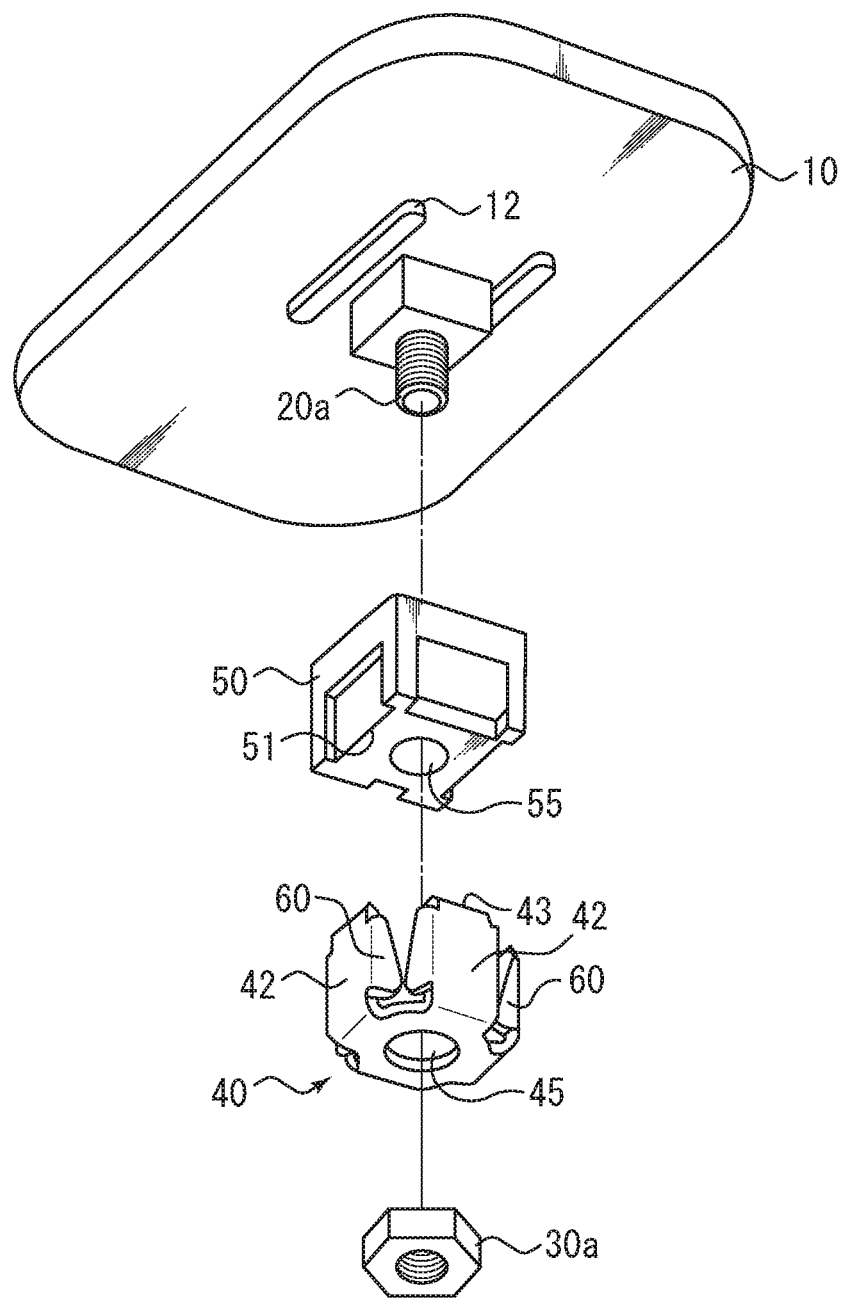
FIG. 6 is an exploded perspective view of another example of the roof-mount antenna mounting structure according to a disclosed embodiment.

Another example of the roof-mount antenna mounting structure according to the present invention is described as follows. FIG. 6 is an exploded perspective view of another example of the roof-mount antenna mounting structure according to the present invention. In the drawing, the same reference numerals as those in FIG. 1 denote the same parts as those in FIG. 1, so descriptions thereof will be omitted. In the example illustrated in FIG. 1, the first threaded portion 20 has a female threaded hole, and the second threaded portion 30 is formed as a male thread, while in the example illustrated in FIG. 6, the male and female members are reversed. That is, the first threaded portion has a male thread, and the second threaded portion is formed as a female threaded nut. Hereinafter, a description will be given with reference to FIG. 6.

In the illustrated example, a male thread 21a protrudes from the antenna base 10 as a first threaded portion. The leg-receiving portion 50 is detachably provided around the first threaded portion 20a. The first threaded portion 20a penetrates through the hole 45 formed in the washer ring 41 of the leg washer 40 and the hole 55 formed in the leg-receiving portion 50 and is fastened with a female threaded nut as a second threaded portion 30a. As a result, the leg portions 42 abut the abutment edge portions 51 of the leg-receiving portion 50 to spread. Then, when the nut is loosened, the leg-receiving portion 50 is separated from the periphery of the first threaded portion 20 together with the leg washer 40. The above behavior is the same as that illustrated in FIGS. 2A to 2D, so that descriptions thereof will be omitted.

As described above, in the roof-mount antenna mounting structure according to the present invention, either one of the first and second threaded portions 20 and 30 may be formed as the male thread, while the other one thereof may be formed as the female thread.

The roof-mount antenna mounting structure according to the present invention is not limited to the illustrated examples described above, but various modification may be made within the scope of the present invention.

10: Antenna base
12: Base
20, 20a: First threaded portion
21: Female threaded hole
30, 30a: Second threaded portion
40: Leg washer
41: Washer ring
42: Leg portion
43: Claw
45: Hole
54: Connecting portion
46: Slit
48: Reinforcing rib
49: Bent portion
50: Leg-receiving portion
51: Abutment edge portion
52: Engaging claw
55: Hole
60: Protruding portion

The invention claimed is:

1. A roof-mount antenna mounting structure for fixing an antenna to a mounting hole formed through a vehicle roof, the roof-mount antenna mourning structure comprising:
   an antenna base disposed outside a vehicle interior;
   a first threaded portion provided on the antenna base so as to protrude toward the vehicle roof and to be inserted into a mounting hole formed through the vehicle roof;
   a second threaded portion fastened with the first threaded portion;
   a leg washer including a washer ring having a hole through which the first or second threaded portion penetrates and a plurality of leg portions extending from the washer ring and each having a claw that is configured to abut against the vehicle roof;
   a leg-receiving portion detachably provided around the first threaded portion and having an abutment edge portion; and
   a protruding portion having, at the inside of the leg portions, an inclined surface that obliquely abuts against the abutment edge portion of the leg-receiving portion when the first and second threaded portions are fastened with each other through the washer ring of the leg washer to apply a pressing force to spread the leg portions outward with respect to the axis of the first threaded portion,
   the leg washer being configured to be detached together with the leg-receiving portion from the first threaded portion in a state where the protruding portion remains stuck fast to the leg-receiving portion when the fastening of the first and second threaded portions are loosened.

2. The roof-mount antenna mounting stricture according to claim 1, wherein
   the protruding portion is formed by bending the leg portion of the leg washer in a dog-leg shape in vertical cross section.

3. The roof-mount antenna mounting structure according to claim 2, wherein
   the leg-receiving portion has an engaging claw engaged in the mounting hole formed through the vehicle roof.

4. The roof-mount antenna mounting structure according to claim 3, wherein
   the leg-receiving portion is separated from the periphery of the first threaded portion together with the leg washer when the fastening of the first and second threaded portions are loosened.

5. The roof-mount antenna mounting structure according to claim 2, wherein
   the leg-receiving portion is separated from the periphery of the first threaded portion together with the leg washer when the fastening of the first and second threaded portions are loosened.

6. The roof-mount antenna mounting structure according to claim 1, wherein the protruding portion is formed of a triangular plate-like body extending from the side surfaces of each leg portion of the leg washer.

7. The roof-mount antenna mounting structure according to claim 6, wherein
the leg-receiving portion has an engaging claw engaged in the mounting hole formed through the vehicle roof.

8. The roof-mount antenna mounting structure according to claim 7, wherein
the leg-receiving portion is separated from the periphery of the first threaded portion together with the leg washer when the fastening of the first and second threaded portions are loosened.

9. The roof-mount antenna mounting structure according to claim 6, wherein
the leg-receiving portion is separated from the periphery of the first threaded portion together with the leg washer when the fastening of the first and second threaded portions are loosened.

10. The roof-mount antenna mounting structure according to claim 1, wherein
the protruding portion is formed so as to connect the vicinities of tip ends of at least two leg portions of the leg washer and to be bent in a dog-leg shape in vertical cross section between the two leg portions.

11. The roof-mount antenna mounting structure according to claim 10, wherein
the leg-receiving portion has an engaging claw engaged in the mounting hole formed through the vehicle roof.

12. The roof-mount antenna mounting structure according to claim 11, wherein
the leg-receiving portion is separated from the periphery of the first threaded portion together with the leg washer when the fastening of the first and second threaded portions are loosened.

13. The roof-mount antenna mounting structure according to claim 10, wherein
the leg-receiving portion is separated from the periphery of the first threaded portion together with the leg washer when the fastening of the first and second threaded portions are loosened.

14. The roof-mount antenna mounting structure according to claim 1, wherein
the leg-receiving portion has an engaging claw engaged in the mounting hole formed through the vehicle roof.

15. The roof-mount antenna mounting structure according to claim 14, wherein
the leg-receiving portion is separated from the periphery of the first threaded portion together with the leg washer when the fastening, of the first and second threaded portions are loosened.

16. The roof-mount antenna mounting structure according to claim 1, wherein
the leg-receiving portion is separated from the periphery of the first threaded portion together with the leg washer when the fastening of the first and second threaded portions are loosened.

* * * * *